United States Patent [19]

Green

[11] 3,883,319

[45] May 13, 1975

[54] FIRE RESISTANT JET FUEL COMPOSITIONS

[75] Inventor: Richard L. Green, St. Louis, Mo.

[73] Assignee: Monsanto Company, St. Louis, Mo.

[22] Filed: Nov. 23, 1973

[21] Appl. No.: 418,532

[52] U.S. Cl. .................................. 44/62; 44/79
[51] Int. Cl. .......... C10l 1/28; C10l 1/24; C10l 1/22
[58] Field of Search ............................ 44/62, 79, 80

[56] References Cited
UNITED STATES PATENTS

| | | | |
|---|---|---|---|
| 2,656,340 | 10/1953 | Sparks et al. | 44/62 |
| 3,419,365 | 12/1968 | Streets | 44/62 |
| 3,443,917 | 5/1969 | LeSuer | 44/62 |
| 3,488,704 | 1/1970 | Lovett et al. | 44/62 |
| 3,499,741 | 3/1970 | Sweeney | 44/62 |
| 3,502,451 | 3/1970 | Moore et al. | 44/62 |
| 3,549,535 | 12/1970 | Young et al. | 44/62 |

FOREIGN PATENTS OR APPLICATIONS 828,861   2/1938   France .................................. 44/62

*Primary Examiner*—Delbert E. Gantz
*Assistant Examiner*—I. Vaughn
*Attorney, Agent, or Firm*—H. B. Roberts

[57] ABSTRACT

Jet fuel compositions containing an elastomer additive selected from:
 a. fluorocarbon rubber
 b. chlorosulfonated polyethylene rubber
 c. polysulfide rubber
 d. silicone rubber
 e. urethane rubber
 f. nitrile rubber
 g. acrylic rubber.

3 Claims, No Drawings

FIRE RESISTANT JET FUEL COMPOSITIONS

BACKGROUND OF THE INVENTION

1. Field of the Invention

This invention relates to jet fuel compositions having improved fire resistance.

2. Description of the Prior Art

There is always a danger of fire when jet fuels are being loaded into aircraft fuel tanks. Likewise, leaks from fuel lines under pressure during aircraft operation also present this hazard.

BRIEF DESCRIPTION OF THE INVENTION

It has been surprisingly found that the jet fuels of the instant invention have improved fire resistance. These fuels contain elastomers in an amount of 0.001% to 10% by weight, based on the total weight of the fuel. By using the above mentioned fuels, fire dangers are reduced.

DETAILED DESCRIPTION OF THE INVENTION

Elastomer is used in the usual sense for all substances having the properties of natural, reclaimed, vulcanized or synthetic rubber, in that they stretch under tension, have a high tensile strength, forcibly retract to their original size and shape after being greatly distorted, which distortion should be at least 100 percent. They have a Poisson's ratio between 0.45 and 0.5. Natural rubber has the two outstanding characteristics of unusual elasticity and vulcanizability. Synthetic rubber-like polymers possess these characteristics in varying degree, although the preferred elastomers are diene rubbers, which class includes natural rubber in its various forms. Others are the butadiene rubbers, which comprise cis-polybutadiene and other polybutadienes, styrene-butadiene copolymer rubbers, chloroprene rubbers, which are polymers of 2-chlorobutadiene-1,3; ethylene propylene diene monomer rubber (EPDM), which is a terpolymer of ethylene, propylene and a nonconjugated diene, butyl rubbers, which are copolymers of isobutylene and a small amount of a conjugated diene, isoprene rubbers, which comprise the various polyisoprene elastomers and nitrile rubbers, which are elastomers made essentially from butadiene and acrylonitrile.

Specialty elastomers which may be used in the practice of the invention are ethylene-propylene copolymer rubber (EP), chlorosulfonated polyethylene, fluorocarbon rubbers, polysulfide rubbers, silicone rubber, urethane rubbers, and acrylic rubbers which are acrylic ester polymers, for example, ethyl acrylate base elastomers.

Other examples are given in Hackh's CHEMICAL DICTIONARY 4th Edition, page 232 and page 233, which is incorporated herein by reference.

Especially preferred are fluorine elastomers, halogen substituted rubbers, polychlorobutadienes, EPDM rubbers, natural rubbers and isobutylene rubbers.

The jet fuels of the instant invention contain these elastomeric materials in an amount of 0.001 to 10 percent by weight, based on the total weight of the fuel. Of course, amounts above 10% can be used except as dictated by incompatibility and costs. It is preferred to use 0.1 to about 2 percent.

The jet fuels whose fire resistance is improved pursuant to this invention are principally hydrocarbon fuel which are heavier than gasoline, i.e., distilled liquid hydrocarbon fuels having a higher endpoint than gasoline. In general, the jet fuels can be comprised of distillate fuels and naphthas and blends of the above, including blends with lighter hydrocarbon fractions, so long as the endpoint of the final jet fuel is at least 224°C., and preferably greater than 248°C. It will be understood, however, that the jet fuels which are employed according to this invention can contain certain other ingredients such as alcohols or the like, provided the resulting fuel blend meets the specifications imposed upon jet fuels. Normally, they boil in the range of about 37°C. to 314°C. and have a freezing point below about −60°C. A description of the properties of jet engine fuel is given by C. W. Kelley in the November 1952 edition of THE PETROLEUM ENGINEER on pages C-7 to C-9.

Typical jet fuels improved according to this invention include JP-3, a mixture of about 70 percent gasoline and 30 percent light distillate having a 90 percent evaporated point of 243°C; JP-4, a mixture of about 65 percent gasoline and 35 percent light distillate, a fuel especially designed for high altitude performance; JP-5, an especially fractionated kerosene; low freezing point kerosene, etc.

Table I gives specifications of typical liquid hydrocarbon jet fuels of this invention.

TABLE I

| | Fuel A (JP-3) | Fuel B (JP-4) | Fuel C (JP-5) | Fuel D (JP-4) | Fuel E (JP-4) Referee | Fuel F (Kerosene) |
|---|---|---|---|---|---|---|
| 10% evaporated, °C. | 71 | 104 | 202 | 105 | — | 193 |
| 90% evaporated, °C. | 243 | 243 | 249 | 193 | 238 | 249 |
| Endpoint, °C. | 314 | 288 | 288 | 249 | 269 | — |
| Gravity, °API. | 50 | 45 | 35 | 47.3 | 48.5 | 43 |
| Existent gum, mg./100 ml., max. | 7 | 7 | 7 | 1.0 | 1.4 | 1.7 |
| Potential gum, mg./100 ml., max. | 14 | 14 | 14 | 1.0 | 9.6 | — |
| Reid vapor pressure, p.s.i. | 7.0 | 3.0 | — | — | — | — |
| Aromatics, vol. % | 25.0 | 25.0 | 25.0 | 12.5 | 14.6 | 14.3 |
| Olefins, vol. % | 5.0 | 5.0 | 5.0 | 0.3 | 1.2 | — |

The elastomers are sufficiently soluble in the jet fuel as not to require mutual solvents or dispersing agents. They may be blended with the jet fuels using conventional means.

Illustrative fuels of this invention are given in Table II below.

TABLE II

| Jet Fuel | Elastomeric Composition and Amount | |
| --- | --- | --- |
| 1. A | Fluorine Elastomer (Kel F) | 0.1% |
| 2. B | Polychlorobutadiene (Neoprene) | 0.5% |
| 3. C | Polyisobutylene (Vistanex) | 1.0% |
| 4. D | EPDM Rubber (Nordel 1470) | 0.1% |
| 5. E | 2-chlorobutadiene Rubber (Neoprene W) | 1.0% |
| 6. F | Butadiene Acrylonitrile (Hycar 1053) | 0.1% | of polyisoprene in the other. They were tested for fire resistance using the Standard F/M High Pressure Spray procedure described in FACTORY MUTUAL BULLETIN containing flamability approval standards for less hazardous hydraulic fluids, as revised on March 8, 1963 Class No. 6930.

Results are given in Table 3.

TABLE 3

| Additive | KG/CM² PSI | Temp. | Radiometer Reading Ergs sq. cm. | Torch 2–4" from orifice | Torch 2' from orifice | Other Conditions |
| --- | --- | --- | --- | --- | --- | --- |
| None | 21 | 27°C. | $2.6 \times 10^{-5}$ | Same as 2 ft. | Sustained burning 2 to 3 ft. long | Continued to burn |
| Polyisoprene | 21 | 27°C. | — | Intermittent burn 2–4' long | Intermittent burn, flames 2–4' long | no burning |
| Polyisoprene | 35 | 27°C. | $1.6 \times 10^{-5}$ | Flash and burn 6–8' burning on back panel | Intermittent flash carried 6' | no burning |
| Polyisoprene | 56 | 27°C. | $11.0 \times 10^{-5}$ | Intermittent burn carried 5 to 6 ft. | Intermittent flash carried 5 to 6 ft. | no burning |
| Natural Rubber | 21 | 28°C. | — | Intermittent burn carried 3 to 4 ft. | Intermittent flames carried 1 to 2 ft. | no burning |
| Natural Rubber | 35 | 28°C. | $0.8 \times 10^{-5}$ | Intermittent flash and burn carried 4–6 ft. | Intermittent flash and burn carried 4–6 ft. | no burning |
| Natural Rubber | 49 | 28°C. | $3.8 \times 10^{-5}$ | Intermittent burn carried 8 ft. to panel. Continued to burn on panel | Intermittent burn carried 6 ft. | no burning |

Other fuels include those containing in place of Fuel A, in No. 1 above, any one of Fuels B to F; in place of Fuel B in No. 2 above, any one of Fuels A and C to F; in place of Fuel C in No. 3 above, any one of Fuels A, B and D to F; in place of Fuel E in No. 5 above, any one of Fuels A to D and F; in place of Fuel F in No. 6 above, any one of Fuels A to E; in place of the elastomer in No. 1 above, any of the elastomers in numbers 2 to 6; in place of the elastomer in No. 2 above, any of the elastomers in 1 and 3 to 6; and in place of the elastomer in No. 4 above, any of the elastomers in 1 to 3 and 5 and 6.

The following examples illustrate various specific embodiments of the invention. All parts are by weight unless otherwise stated.

EXAMPLE I

Two jet fuels (JP-4) were prepared by blending 1% of natural rubber with the fuel in one instance and 1%

From a consideration of the above specification, it would be understood that many improvements and modifications in details may be made without departing from the spirit and scope of the invention. It is to be understood, therefore, that the invention is not limited, except as defined by the appended Claims, which constitutes part of the description of the present invention, and are to be considered as such.

What is claimed is:

1. A jet fuel having improved fire resistance comprising a distilled liquid hydrocarbon fuel having an endpoint of at least 224°C. containing from about 0.001 to 10 percent of an elastomer, selected from the group consisting of fluorocarbon rubber, chlorosulfonated polyethylene rubber, polysulfide rubber, silicon rubber, urethane rubber, nitrile rubber and acrylic rubber.

2. A fuel according to claim 1 where said elastomer is present in an amount from about 0.1 to about 2 percent.

3. A fuel according to claim 1 wherein said elastomer is a silicone rubber.

* * * * *